(12) United States Patent
Wei

(10) Patent No.: US 11,265,834 B2
(45) Date of Patent: Mar. 1, 2022

(54) BASE STATIONS AND METHODS FOR TIME-SENSITIVE NETWORKING (TSN) CLOCK INFORMATION DELIVERY

(71) Applicant: Acer Incorporated, New Taipei (TW)

(72) Inventor: Hung-Yu Wei, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 230 days.

(21) Appl. No.: 16/598,355

(22) Filed: Oct. 10, 2019

(65) Prior Publication Data

US 2021/0112510 A1  Apr. 15, 2021

(51) Int. Cl.
| | | |
|---|---|---|
| *H04W 56/00* | (2009.01) | |
| *H04J 3/06* | (2006.01) | |
| *H04W 72/04* | (2009.01) | |
| *H04W 72/12* | (2009.01) | |
| *H04W 74/08* | (2009.01) | |
| *H04L 29/08* | (2006.01) | |

(52) U.S. Cl.
CPC ....... *H04W 56/0015* (2013.01); *H04J 3/0658* (2013.01); *H04W 72/0406* (2013.01); *H04W 72/1205* (2013.01); *H04W 72/1278* (2013.01)

(58) Field of Classification Search
CPC ......... H04W 56/0015; H04W 72/0406; H04W 72/1205; H04W 72/1278; H04W 74/08; H04J 3/0658; H04J 3/0638; H04J 3/0641; H04L 67/125
See application file for complete search history.

(56) References Cited

U.S. PATENT DOCUMENTS

| | | | | |
|---|---|---|---|---|
| 7,310,524 | B2 * | 12/2007 | Kurokawa | H04W 88/08 370/352 |
| 11,051,321 | B2 * | 6/2021 | Moon | H04W 72/1257 |
| 2006/0104232 | A1 * | 5/2006 | Gidwani | H04W 28/18 370/328 |
| 2008/0260389 | A1 * | 10/2008 | Zheng | H04W 92/045 398/115 |
| 2013/0301541 | A1 * | 11/2013 | Mukherjee | H04W 74/0833 370/329 |
| 2016/0080248 | A1 * | 3/2016 | Rijnders | H04L 41/5009 709/224 |
| 2017/0346588 | A1 * | 11/2017 | Prins | H04J 3/0667 |

(Continued)

OTHER PUBLICATIONS

Chinese language office action dated Oct. 23, 2020, issued in application No. TW 108145474.

(Continued)

*Primary Examiner* — Harry H Kim
(74) *Attorney, Agent, or Firm* — McClure, Qualey & Rodack, LLP

(57) ABSTRACT

A base station of a telecommunication network is provided. The base station includes a wired transceiver, a wireless transceiver, and a controller. The wired transceiver provides wired communication with a first Time-Sensitive Networking (TSN) domain outside the telecommunication network. The wireless transceiver provides wireless Time-Sensitive Communication (TSC) with a User Equipment (UE). A controller is configured to receive first TSN clock information from the first TSN domain via the wired transceiver, and schedule a transmission of the first TSN clock information to the UE via the wireless transceiver.

26 Claims, 10 Drawing Sheets

(56) References Cited

U.S. PATENT DOCUMENTS

| | | | |
|---|---|---|---|
| 2018/0237039 A1* | 8/2018 | Mong | H04L 67/322 |
| 2018/0309655 A1* | 10/2018 | Joseph | G06F 11/2294 |
| 2019/0064873 A1* | 2/2019 | Carlstedt | G06F 1/12 |
| 2019/0239172 A1* | 8/2019 | Hampel | H04W 76/12 |
| 2019/0342800 A1* | 11/2019 | Sirotkin | H04B 17/318 |
| 2020/0028791 A1* | 1/2020 | McGrath | H04L 41/145 |
| 2020/0053678 A1* | 2/2020 | Moon | H04W 88/023 |
| 2020/0112975 A1* | 4/2020 | Moon | H04W 56/005 |
| 2020/0195528 A1* | 6/2020 | Barton | H04L 47/2475 |
| 2020/0228220 A1* | 7/2020 | Joseph | H04J 3/0644 |
| 2020/0236008 A1* | 7/2020 | Safavi | H04L 41/147 |
| 2020/0267672 A1* | 8/2020 | Chien | H04W 56/001 |
| 2020/0280383 A1* | 9/2020 | Herber | H04J 3/0638 |
| 2020/0314784 A1* | 10/2020 | Baek | H04W 56/0015 |
| 2020/0322908 A1* | 10/2020 | Prakash | H04W 56/004 |
| 2020/0351804 A1* | 11/2020 | Moon | H04W 76/25 |
| 2020/0412813 A1* | 12/2020 | Mong | H04L 47/283 |
| 2021/0219253 A1* | 7/2021 | Van Phan | H04W 56/0055 |

OTHER PUBLICATIONS

"Technical Specification Group Services and System Aspects; System Architecture for the 5G System (5GS); Stage 2; (Release 16);" Sep. 2019; pp. 1-389.

"Technical Specification Group Services and System Aspects; Study on enhancement of 5G System (5GS) for vertical and Local Area Network (LAN) services; (Release 16);" Jun. 2019; pp. 1-117.

* cited by examiner

Clock info sent from TSN domain 1

Clock info arrives at BS

BS delivers clock info to UE(s)

Clock info arrives at BS

BS delivers clock info to UE(s)

Clock info sent from TSN domain 1

Clock info sent from TSN domain 2

BS delivers clock info to UE(s)

Clock info sent from TSN domain 1

Clock info sent from TSN domain 2

BS delivers clock info to UE(s)

Clock info sent from TSN domain 1

Clock info sent from TSN domain 2

BS delivers clock info to UE(s)

BASE STATIONS AND METHODS FOR TIME-SENSITIVE NETWORKING (TSN) CLOCK INFORMATION DELIVERY

BACKGROUND OF THE APPLICATION

Field of the Application

The application generally relates to mobile communications, and more particularly, to base stations and methods for Time-Sensitive Networking (TSN) clock information delivery.

Description of the Related Art

With growing demand for ubiquitous computing and networking, various Radio Access Technologies (RATs) have been developed, including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Long Term Evolution (LTE) technology, LTE-Advanced (LTE-A) technology, and Time-Division LTE (TD-LTE) technology.

These RATs have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In particular, Industrial Internet of Things (IIoT) has been envisioned to become an important 5G application. To support delay-sensitive requirements of the IIoT applications, Time-Sensitive Communications (TSC) for 5G will be an emerging technology. On the other hand, an Ethernet-based Time-Sensitive Networking (TSN) solution has been developed for low-latency, low-jitter, and low lost-rate networking applications, such as gaming, delay-sensitive remote control, robotics control, industrial automation, motion control, Automated Guided Vehicles (AGV) control, etc.

As such, there may be scenarios in which a 5G wireless network is used to provide TSN services. Since Ethernet-based TSN mechanisms improve the deterministic delivery of time-sensitive packets, accurate reference timing is needed for Ethernet-based TSN. Therefore, accurate reference timing delivery mechanisms between the Ethernet-based TSN domain and the cellular-based (e.g., 5G and/or 6G) TSC domain will be needed.

BRIEF SUMMARY OF THE APPLICATION

In one aspect of the application, a base station of a telecommunication network is provided. The base station comprises a wired transceiver, a wireless transceiver, and a controller. The wired transceiver is configured to provide wired communication with a first Time-Sensitive Networking (TSN) domain outside the telecommunication network. The wireless transceiver is configured to provide wireless Time-Sensitive Communication (TSC) with a User Equipment (UE). A controller is configured to receive first TSN clock information from the first TSN domain via the wired transceiver, and schedule a transmission of the first TSN clock information to the UE via the wireless transceiver.

In another aspect of the application, a method for TSN clock information delivery, executed by a base station of a telecommunication network, which is connected to a first TSN domain outside the telecommunication network and in TSC with a UE, is provided. The method comprises the steps of: receiving first TSN clock information from the first TSN domain; and scheduling a transmission of the first TSN clock information to the UE.

Other aspects and features of the invention will become apparent to those with ordinary skill in the art upon review of the following descriptions of specific embodiments of the base stations and the method for TSN clock information delivery.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
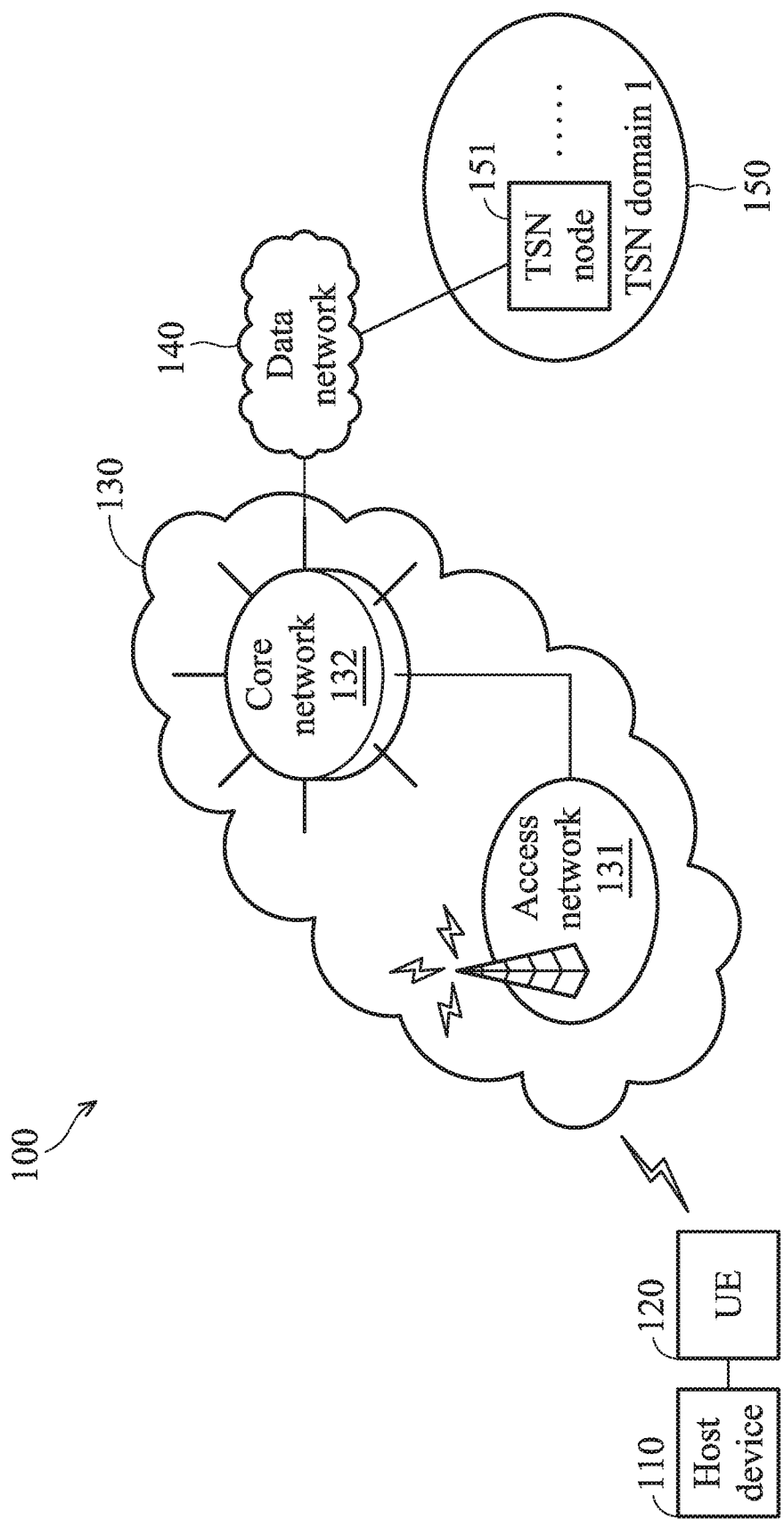
FIG. 1 is a block diagram of a wireless communication environment according to an embodiment of the application.

FIG. 1 is a block diagram of a wireless communication environment according to an embodiment of the application.

The wireless communication environment 100 includes a host device 110, a User Equipment (UE) 120, a telecommunication network 130, a Data Network (DN) 140, and a TSN domain 150.

The host device 110 may be a computing device running an application that involves TSN communication with the TSN node 151 in the TSN domain 150. For example, the application may be related to remote control of machinery, such as robotics control, industrial automation, or Automated Guided Vehicles (AGV) control. For TSN communication between the host device 110 and the TSN domain 150, accurate reference timing from the TSN domain 150 is essential to the host device 110.

In particular, TSN communication between the host device 110 and the TSN domain 150 is provided via the cellular-based TSC, i.e., wireless communication between the UE 120 and the telecommunication network 130.

The UE 120 may be a smartphone, a tablet PC, a laptop computer, a wireless IoT gateway, a wireless communication module for industrial machine, or any wireless communication device supporting the RAT utilized by the telecommunication network 130.

The UE 120 may be wirelessly connected to the telecommunication network 130 for obtaining Time-Sensitive Communication (TSC) services. In addition, the UE 120 may be connected to the host device 110 through a wired link (e.g., Ethernet).

The telecommunication network 130 may be connected to the TSN domain 150 via the DN 140 to receive the TSN clock information from the TSN node 151 in the TSN domain 150. In addition, the telecommunication network 130 may be wirelessly connected to the UE 120 to send the TSN clock information through Time-Sensitive Communications (TSC), whereby the UE 120 may forward the TSN clock information to the host device 110 for TSN timing synchronization.

Specifically, the telecommunication network 130 may include an access network 131 and a core network 132. The access network 131 is responsible for processing radio signals, terminating radio protocols, and connecting the UE 120 with the core network 132. The core network 132 is responsible for performing mobility management, network-side authentication, and interfaces with public/external networks (e.g., the DN 140).

The access network 131 and the core network 132 may each include one or more network nodes for carrying out said functions. For example, if the telecommunication network 130 is a 5G NR network, the access network 131 may be a Next Generation Radio Access Network (NG-RAN) which includes at least a base station, such as a gNB or Transmission Reception Point (TRP), and the core network 132 may be a Next Generation Core Network (NG-CN) which includes various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session.

The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

The DN 140 may be any wired network, such as Ethernet, optical network, or Asymmetric Digital Subscriber Line (ADSL) network, etc., which is responsible for connecting the core network 132 with the TSN domain 150 via a wired link.

TSN domain 150 may refer to a TSN network which includes one or more TSN nodes that operate in the same frame of timing, wherein each TSN node may be a device supporting TSN communications. That is, the TSN nodes in the TSN domain 150 may have the same TSN clock. In particular, the TSN node 151 is in TSN communication with the host device 110.

It should be understood that wireless communication environment 100 is for illustrative purposes only and is not intended to limit the scope of the application. For example, the RAT utilized by the telecommunication network 130 may be any RAT more advanced than 5G, or there may be multiple TSN domains in TSN communication with the host device 110 or other host devices.

Figure 2:
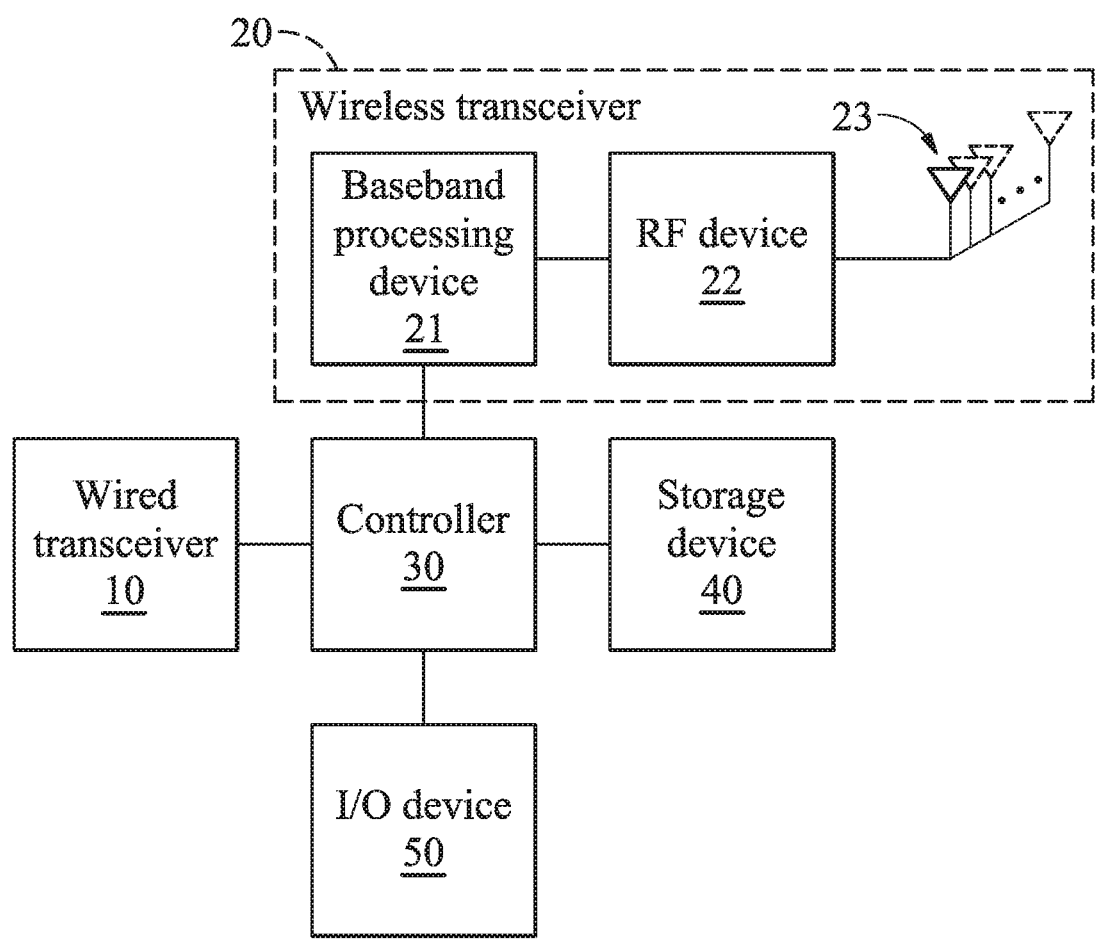
FIG. 2 is a block diagram illustrating a base station according to an embodiment of the application.

FIG. 2 is a block diagram illustrating a base station according to an embodiment of the application.

As shown in FIG. 2, a base station may include a wired transceiver 10, a wireless transceiver 20, a controller 30, a storage device 40, and an Input/Output (I/O) device 50.

The wired transceiver 10 is configured to provide wired communication with the network nodes of the core network 132 and the TSN node 151 of the TSN domain 150. Specifically, wired communication may be provided by wired links, such as Ethernet cables, ADSL cables, optical cables, twisted-pair cables, or coaxial cables, etc.

The wireless transceiver 20 is configured to provide wireless TSC with the UE 120. Specifically, the wireless transceiver 20 may include a baseband processing device 21, a Radio Frequency (RF) device 22, and an antenna 23, wherein the antenna 23 may include an antenna array for beamforming.

The baseband processing device 21 is configured to perform baseband signal processing and control communication between subscriber identity card(s) (not shown) and the RF device 22. The baseband processing device 21 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 22 may receive RF wireless signals via the antenna 23, convert the received RF wireless signals to baseband signals, which are processed by the baseband processing device 21, or receive baseband signals from the baseband processing device 21 and convert the received baseband signals to RF wireless signals, which are later transmitted via the antenna 23. The RF device 22 may also contain multiple hardware devices to perform radio frequency conversion. For example, the RF device 22 may comprise a mixer to multiply the baseband signals with a carrier oscillated in the radio frequency of the supported cellular technologies, wherein the radio frequency may be any radio frequency (e.g., 30 GHz~300 GHz for mmWave) utilized in the 5G NR technology, or may be 900 MHz, 1800 MHz, 2100 MHz, 3500 MHz, 28 GHz, or another radio frequency, depending on the RAT in use.

The controller 30 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wired transceiver 10 for wired communication with the TSN domain 150, controlling the wireless transceiver 20 for wireless communication with the UE 120, storing and retrieving data (e.g., program code) to and from the storage device 40, and receiving user inputs or outputting signals via the I/O device 50.

In particular, the controller 30 coordinates the aforementioned operations of the wired transceiver 10, the wireless transceiver 20, the storage device 40, and the I/O device 50 for performing the method for TSN clock information delivery.

In another embodiment, the controller 30 may be incorporated into the baseband processing device 21, to serve as a baseband processor.

As will be appreciated by persons skilled in the art, the circuits of the controller 30 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 40 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data (e.g., the mappings between a plurality of RACH preambles and a plurality of TSN domains), instructions, and/or program code of applications, communication protocols, and/or the method for TSN clock information delivery.

The I/O device 50 may include one or more buttons, a keyboard, a mouse, a touch pad, a video camera, a microphone, and/or a speaker, etc., to serve as the Man-Machine Interface (MIMI) for interaction with users.

It should be understood that the components described in the embodiment of FIG. 2 are for illustrative purposes only and are not intended to limit the scope of the application. For example, a base station may include more components, such as a power bank, and/or a display device, wherein the power bank may be a battery providing power to all the other components of the base station, and the display device may be a Liquid-Crystal Display (LCD), a Light-Emitting Diode (LED) display, an Organic LED (OLED) display, or an Electronic Paper Display (EPD), etc., for providing a display function.

Figure 3:
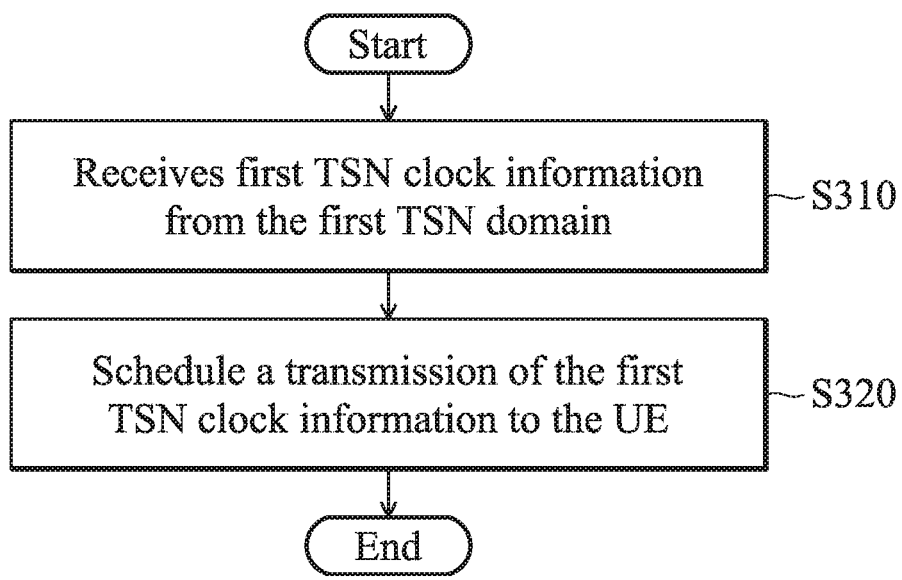
FIG. 3 is a flow chart illustrating the method for TSN clock information delivery according to an embodiment of the application.

FIG. 3 is a flow chart illustrating the method for TSN clock information delivery according to an embodiment of the application.

In this embodiment, the method for TSN clock information delivery is applied to and executed by a base station of a telecommunication network (e.g., the telecommunication network 130), which is connected to a first TSN domain outside the telecommunication network and in TSC with a UE (e.g., the UE 120).

To begin with, the base station receives first TSN clock information from the first TSN domain (step S310).

In one embodiment, before step S310, the base station may send a signaling message to the first TSN domain to request the first TSN clock information.

In another embodiment, the base station may further send a signaling message to the first TSN domain to request desirable configuration of TSN clock information delivery, wherein the desirable configuration of TSN clock information delivery may include one or more of the following parameters: (1) the period after which the delivery of the first TSN clock information repeats; (2) the starting time of the delivery of the first TSN clock information; (3) the ending time of the delivery of the first TSN clock information; (4) the timing offset for the next delivery of the first TSN clock information.

In another embodiment, the base station may send a signaling message to the UE to announce the availability of the first TSN clock information.

Subsequent to step S310, the base station schedules transmission of the first TSN clock information to the UE (step S320), and the method ends.

Specifically, the first TSN clock information may be transmitted through a broadcast channel, or may be transmitted in a System Information Broadcast (SIB) message, a unicast packet, or a group-cast packet. For example, the group-cast packet may be sent to a configured set of UEs which may be interested in the first TSN clock information of the first TSN domain, wherein the group-cast packet may be sent through a Single Frequency Network (SFN) mechanism or a Single-Cell Point-To-Multipoint (SC-PTM) mechanism.

The details regarding the scheduling of the transmission of the first TSN clock information will be described in the following figures.

Figure 4:
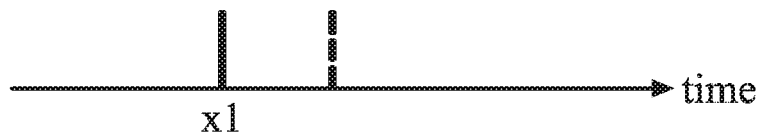
FIG. 4 is a schematic diagram illustrating the timing of TSN clock information delivery according to an embodiment of the application.
Figure 4:
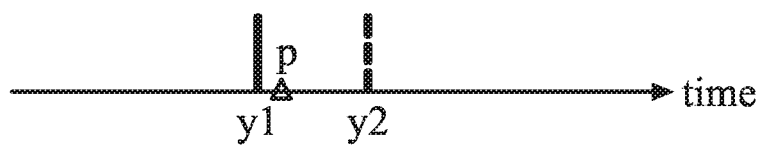
Figure 4:
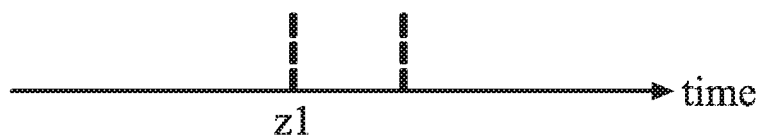

FIG. 4 is a schematic diagram illustrating the timing of TSN clock information delivery according to an embodiment of the application.

As shown in FIG. 4, a TSN clock information is sent from TSN domain 1 at time x1 and arrives at the base station at time y1, and the base station decides the timing for TSN clock information delivery (i.e., schedules the transmission of the TSN clock information) at time p, while the next TSC communication resource for the transmission of the TSN clock information will be available at time z1, and the next arrival of the TSN clock information from TSN domain 1 at the base station will occur at time y2.

The base station may decide the timing for TSN clock information delivery according to one or more of the following information: (1) the determination of whether the UE is new to the base station; (2) the determination of whether the UE requests updating TSN clock information; (3) the age of the TSN clock information from time it was sent from TSN domain 1 to the time of the scheduling of the transmission of the TSN clock information (i.e., p−x1); (4) the age of the TSN clock information from the time it was received at the base station to the time of the scheduling of the transmission of the TSN clock information (i.e., p−y1); (5) the time duration from the time of the scheduling of the transmission of the TSN clock information to the time of the next arrival of the TSN clock information at the base station (i.e., y2−p); (6) the time duration from the time of the scheduling of the transmission of the TSN clock information to the time of the next expected transmission of the TSN clock information at the base station (i.e., z1−p); (7) the number of UEs requesting the TSN clock information; (8) the accuracy or age requirement of the TSN clock information, which is indicated by a TSN clock request received from the UE.

In one embodiment, the base station may schedule the transmission of the TSN clock information in the earliest available TSC communication resource (e.g., right after time p or some time before z1), when the UE is new to the base station (e.g., UE is handed over from another cell or just joins the telecommunication network to which the base station belongs) or when the UE explicitly requests a TSN clock information update (this scenario will be later exemplified in FIG. 5). Otherwise, the base station may defer the transmission of the TSN clock information until the time of the next expected transmission of the TSN clock information (e.g., z1), when the UE is not new to the base station, or when the UE does not request a TSN clock information update, or when the UE explicitly requests a TSN clock information update but p−y1 is higher than the first threshold or y2−p is lower than the second threshold (this scenario will be later exemplified in FIG. 6).

In one embodiment, the base station may schedule the transmission of the TSN clock information in the earliest available TSC communication resource (e.g., right after time p or some time before z1), when p−x1 is lower than a first threshold, or p−y1 is lower than a second threshold, or y2−p is higher than a third threshold, or z1−p is higher than a fourth threshold. Otherwise, the base station may defer the transmission of the TSN clock information until the time of the next expected transmission of the TSN clock information (e.g., z1), when p−x1 is not lower than the first threshold, or p−y1 is not lower than the second threshold, or y2−p is not higher than the third threshold, or z1−p is not higher than the fourth threshold.

In one embodiment, the base station may schedule the transmission of the TSN clock information in the earliest available TSC communication resource (e.g., right after time p or some time before z1), when p−x1 is lower than the first threshold and y2−p is higher than the third threshold, or when p−y1 is lower than the second threshold or z1−p is higher than the fourth threshold.

In one embodiment, the base station may schedule the transmission of the TSN clock information in the earliest available TSC communication resource (e.g., right after time p or some time before z1), when the number of UEs requesting the TSN clock information of the same TSN domain is higher than the fifth threshold (this scenario will be later exemplified in FIG. 7). Otherwise, when the number of UEs requesting the TSN clock information of the same TSN domain is not higher than the fifth threshold, the base station may defer the transmission of the TSN clock information until the number of UEs requesting the TSN clock information of the same TSN domain is higher than the fifth threshold (this scenario will also be later exemplified in FIG. 7).

In one embodiment, the base station may skip the transmission of the TSN clock information when the number of UEs requesting the TSN clock information is not higher than the fifth threshold, or when the accuracy or age requirement of the TSN clock information is low enough to endure the period of the transmission of the TSN clock information being extended (this scenario will also be later exemplified in FIG. 10). For example, if the TSN clock information delivery is performed on a periodic basis by the base station, and the number of UEs requesting the TSN clock information of a TSN domain is low (e.g., lower than a predetermined threshold), then the base station may skip some of the TSN clock information delivery with a longer period.

Figure 5:
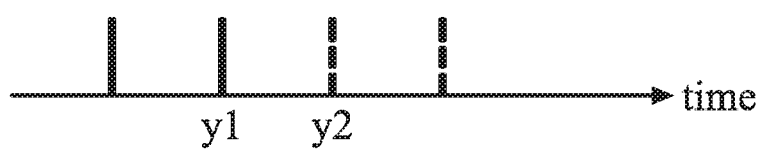
FIG. 5 is a schematic diagram illustrating on-demand TSN clock information delivery according to an embodiment of the application.
Figure 5:

FIG. 5 is a schematic diagram illustrating on-demand TSN clock information delivery according to an embodiment of the application.

In this embodiment, the TSN clock information delivery is not performed on a periodic basis. Instead, the TSN clock information is delivered by the UE's request.

As shown in FIG. 5, the base station receives a TSN clock request from the UE at time z2, and in response, the base station sends the TSN clock information to the UE right after time z2 (e.g., z3). For example, the TSN clock request may indicate that an immediate update of TSN clock information is required, and the base station may send the TSN clock information as early as possible.

Figure 6:
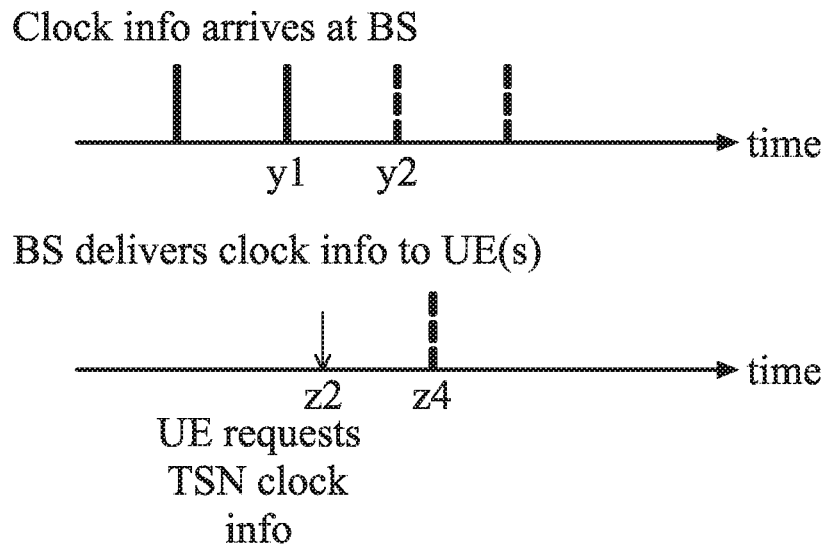
FIG. 6 is a schematic diagram illustrating on-demand TSN clock information delivery according to another embodiment of the application.

FIG. 6 is a schematic diagram illustrating on-demand TSN clock information delivery according to another embodiment of the application.

In this embodiment, the TSN clock information delivery is not performed on a periodic basis. Instead, the TSN clock information is delivered by the UE's request.

As shown in FIG. 6, the base station receives a TSN clock request from the UE at time z2, and in response to p−y1 being higher than the first threshold or y2−p being lower than the second threshold, the base station decides to defer the transmission of the TSN clock information until the next TSN clock information is received (e.g. the base station may receive clock information at time y2 and deliver at time z4).

Figure 7:
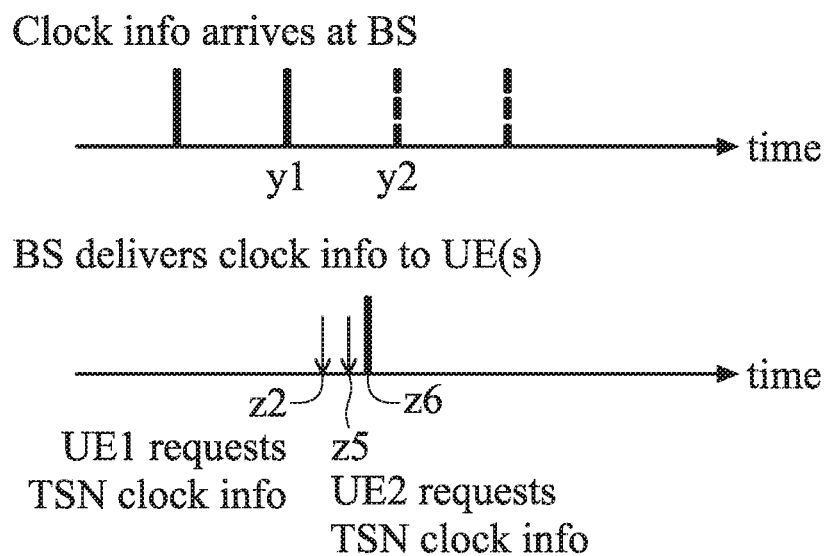
FIG. 7 is a schematic diagram illustrating on-demand TSN clock information delivery according to another embodiment of the application.

FIG. 7 is a schematic diagram illustrating on-demand TSN clock information delivery according to another embodiment of the application.

In this embodiment, the TSN clock information delivery is not performed on a periodic basis. Instead, the TSN clock information is delivered by the UE's request.

As shown in FIG. 7, the base station receives a TSN clock request from a UE at time z2, and in response to not accumulating a number (e.g., 2) of TSN clock requests, the base station decides to defer the transmission of the TSN clock information. After that, the base station receives another TSN clock request from another UE at time z5, and in response accumulating a number (e.g., 2) of TSN clock requests, the base station sends the TSN clock information to the requesting UEs at time z6.

Regarding on-demand TSN clock information delivery, the base station may send a signaling message to the UE to indicate Physical Random Access Channel (PRACH) resources for the UE to send the TSN clock request, and a mapping between a plurality of RACH preambles and a plurality of TSN domains, wherein each RACH preamble corresponds to a respective TSN domain. If a specific RACH preamble is used to request the TSN clock information, the base station would know which TSN domain that the UE requests TSN clock information.

Figure 8:
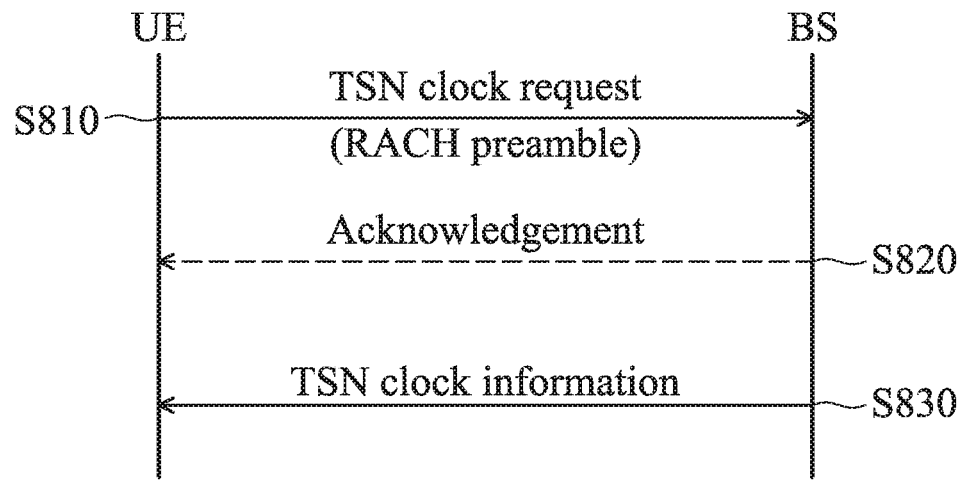
FIG. 8 is a message sequence chart illustrating the signaling flow to request TSN clock information according to an embodiment of the application.

FIG. 8 is a message sequence chart illustrating the signaling flow to request TSN clock information according to an embodiment of the application.

In step S810, the UE sends a TSN clock request to the base station to request TSN clock information.

Specifically, the TSN clock request may be or may include a RACH preamble that was previously allocated by the base station for requesting TSN clock information.

In step S820, the base station replies to the UE with an acknowledgement for the reception of the TSN clock request.

In step S830, the base station sends the TSN clock information of the TSN domain corresponding to the RACH preamble to the UE.

In another embodiment, step S820 may be skipped. That is, when receiving the TSN clock request, the base station may respond to the UE with the TSN clock information without acknowledging the reception of the TSN clock request to the UE.

Figure 9:
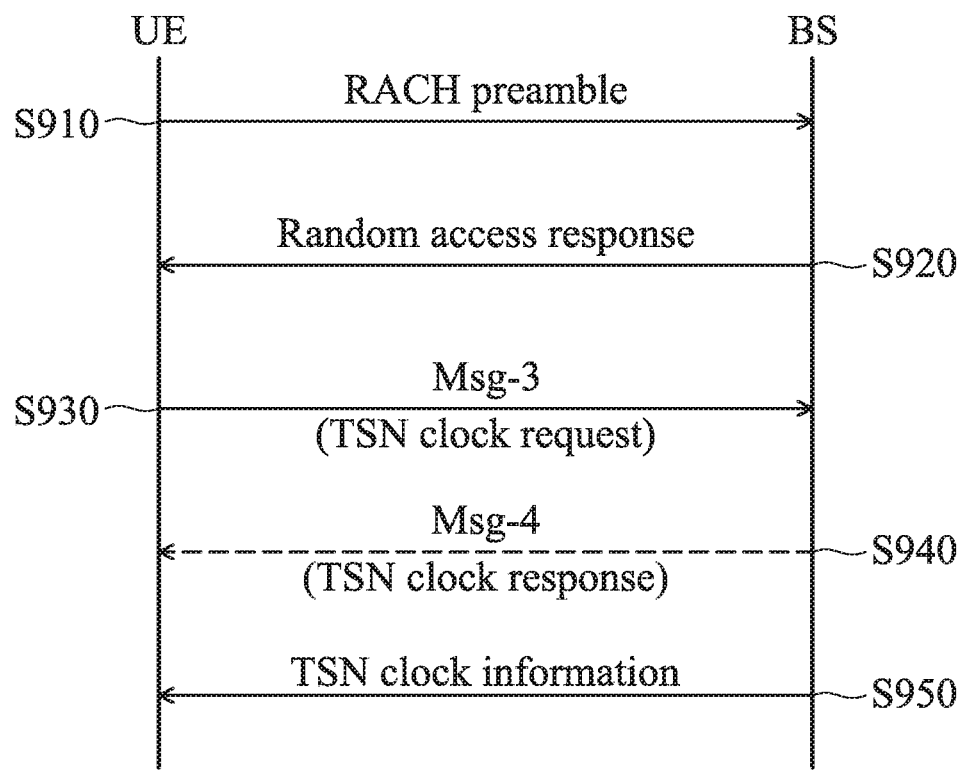
FIG. 9 is a message sequence chart illustrating the signaling flow to request TSN clock information according to another embodiment of the application.

FIG. 9 is a message sequence chart illustrating the signaling flow to request TSN clock information according to another embodiment of the application.

In step S910, the UE initiates a RACH procedure by sending a RACH preamble to the base station, wherein the RACH preamble was previously allocated by the base station for initiating a request for TSN clock information.

In step S920, the base station replies to the UE with a random access response to acknowledge the reception of the RACH preamble.

In step S930, the UE sends a Radio Resource Control (RRC) message for scheduled transmission, wherein the RRC message is also referred to as the message-3 (Msg-3) of the RACH procedure and includes a TSN clock request.

In step S940, the base station replies to the UE with an RRC message for contention resolution, wherein the RRC message is also referred to as the message-4 (Msg-4) of the RACH procedure and may include a TSN clock response to acknowledge the reception of the Msg-3.

In step S950, the base station sends the TSN clock information of the TSN domain corresponding to the RACH preamble to the UE.

In another embodiment, step S940 may be skipped. That is, when receiving the Msg-3 including the TSN clock request, the base station may respond to the UE with the TSN clock information without acknowledging the reception of the Msg-3 to the UE.

Figure 10:
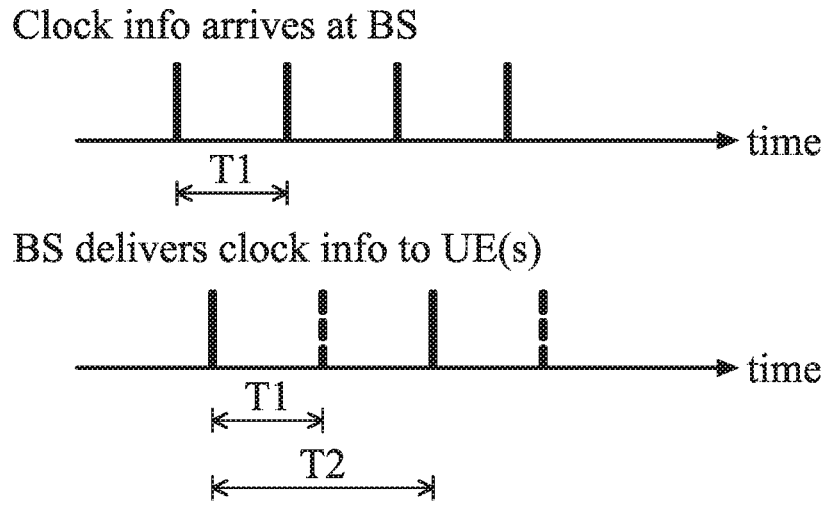
FIG. 10 is a schematic diagram illustrating periodic delivery of TSN clock information according to an embodiment of the application.

FIG. 10 is a schematic diagram illustrating periodic delivery of TSN clock information according to an embodiment of the application.

In this embodiment, the TSN clock information delivery is performed on a periodic basis by the base station.

As shown in FIG. 10, the base station periodically receives the TSN clock information from the same TSN domain with a period T1. Assuming that the number of UEs requesting the TSN clock information of the same TSN domain is low, the base station may skip one of every two TSN clock information deliveries, by extending the period from T1 to T2.

Figure 11:
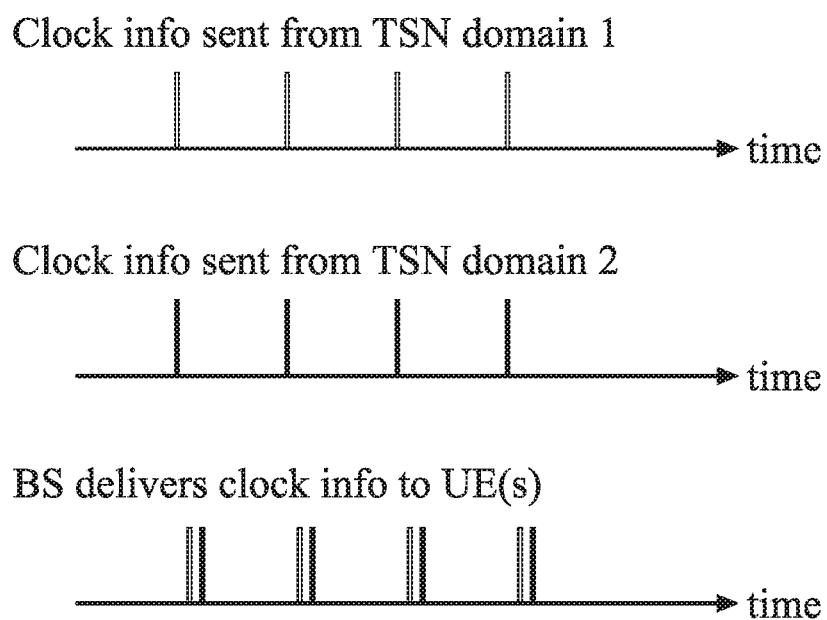
FIG. 11 is a schematic diagram illustrating separate delivery of TSN clock information from multiple TSN domains according to an embodiment of the application.

FIG. 11 is a schematic diagram illustrating separate delivery of TSN clock information from multiple TSN domains according to an embodiment of the application.

In this embodiment, the TSN clock information delivery is performed on a periodic basis by the base station, and the TSN clock information from different TSN domains is delivered to the UE(s) separately.

As shown in FIG. 11, the base station receives the TSN clock information from TSN domain 1 and TSN domain 2 at approximately the same time with the same periodicity.

For each received TSN clock information, the base station sends the TSN clock information to the UE(s) right after the TSN clock information is received. In particular, the TSN clock information from TSN domain 1 is sent to the UE(s) prior to the TSN clock information from TSN domain 2.

Figure 12:
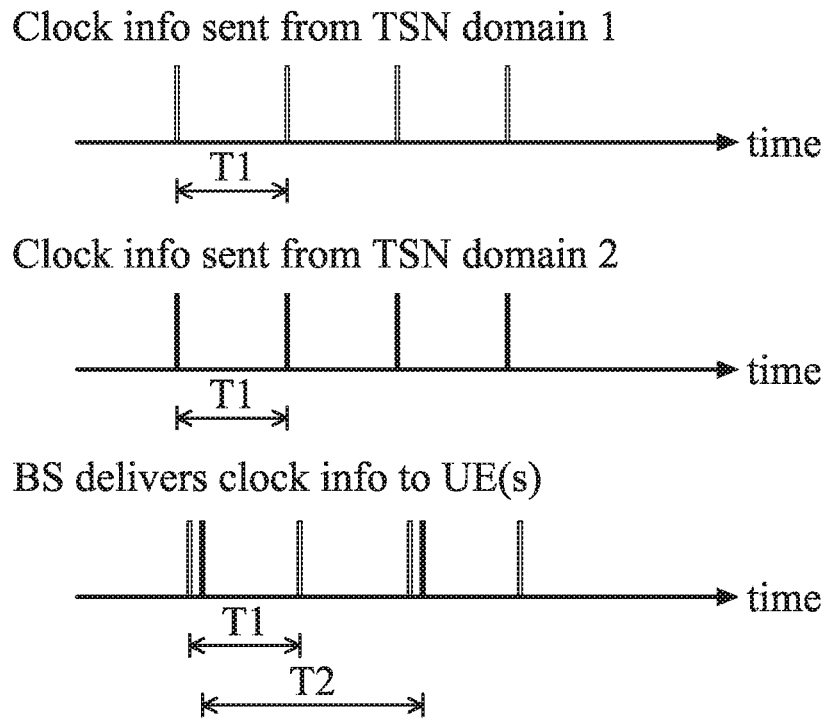
FIG. 12 is a schematic diagram illustrating separate delivery of TSN clock information from multiple TSN domains according to another embodiment of the application.

FIG. 12 is a schematic diagram illustrating separate delivery of TSN clock information from multiple TSN domains according to another embodiment of the application.

In this embodiment, the TSN clock information delivery is performed on a periodic basis by the base station, and the TSN clock information from different TSN domains is delivered to the UE(s) separately.

As shown in FIG. 12, the base station receives the TSN clock information from TSN domain 1 and TSN domain 2 at approximately the same time with the same periodicity.

For each TSN domain, the periodicity of TSN clock information delivery may be adjusted according to user needs (e.g., the accuracy or age requirement of the TSN clock information, which is indicated by the TSN clock request received from the UE) or the number of UEs requesting/subscribed for the TSN clock information.

For example, the TSN clock information from TSN domain 1 and the TSN clock information from TSN domain 2 are sent to the base station with the same period T1. Assuming that the number of UEs requesting/subscribed for the TSN clock information from TSN domain 2 is low, the base station may skip one of every two TSN clock information deliveries, by extending the period from T1 to T2. Meanwhile, assuming that the number of UEs requesting/subscribed for the TSN clock information from TSN domain 1 is high, the base station may retain the period T1 for delivering the TSN clock information from TSN domain 1.

Figure 13:
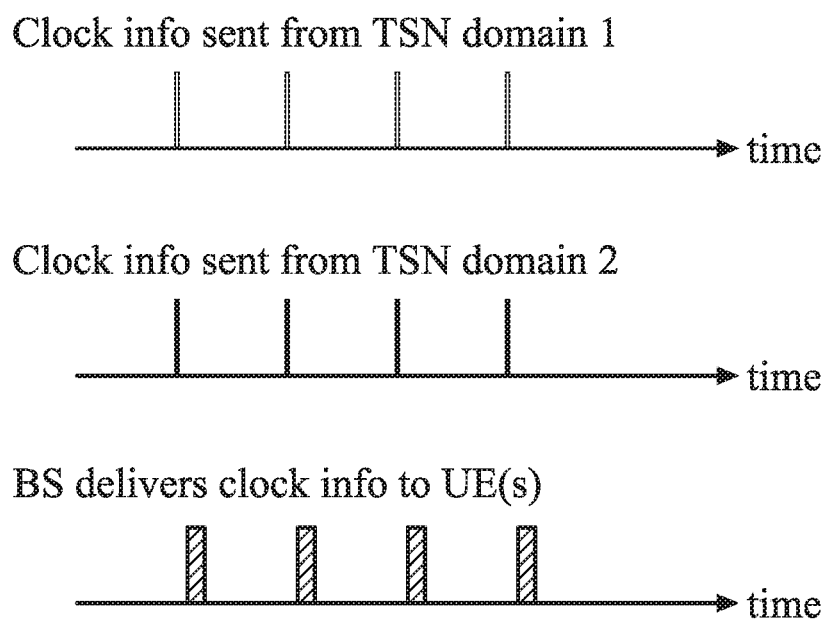
FIG. 13 is a schematic diagram illustrating aggregated delivery of TSN clock information from multiple TSN domains according to an embodiment of the application.

FIG. 13 is a schematic diagram illustrating aggregated delivery of TSN clock information from multiple TSN domains according to an embodiment of the application.

In this embodiment, the TSN clock information delivery is performed on a periodic basis by the base station, and the TSN clock information from different TSN domains is aggregated before being delivered to the UE(s).

As shown in FIG. 13, the base station receives the TSN clock information from TSN domain 1 and TSN domain 2 at approximately the same time with the same periodicity.

For each delivery, the base station aggregates the TSN clock information from different TSN domains and then sends the aggregated information to the UE(s) right after the TSN clock information is received.

Figure 14:
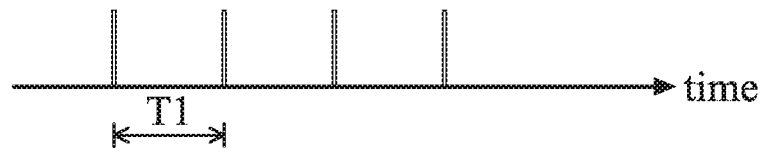
FIG. 14 is a schematic diagram illustrating aggregated delivery of TSN clock information from multiple TSN domains according to another embodiment of the application.
Figure 14:
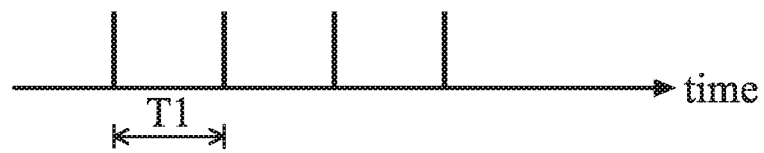
Figure 14:
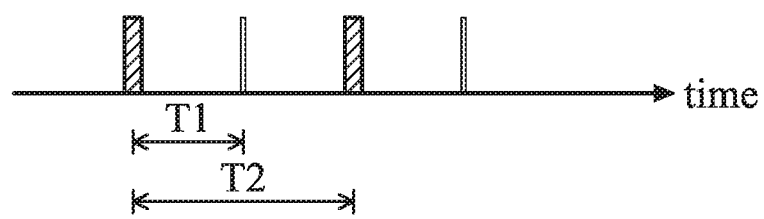

FIG. 14 is a schematic diagram illustrating aggregated delivery of TSN clock information from multiple TSN domains according to another embodiment of the application.

In this embodiment, the TSN clock information delivery is performed on a periodic basis by the base station, and the TSN clock information from different TSN domains may be aggregated before being delivered to the UE(s).

As shown in FIG. 14, the base station receives the TSN clock information from TSN domain 1 and TSN domain 2 at approximately the same time with the same periodicity.

For each delivery, the base station may decide whether to aggregate the TSN clock information from different TSN domains or to send the TSN clock information from different TSN domains separately, according to user needs (e.g., the accuracy or age requirement of the TSN clock information, which is indicated by the TSN clock request received from the UE) or the number of UEs requesting/subscribed for the TSN clock information.

For example, the TSN clock information from TSN domain 1 and the TSN clock information from TSN domain 2 are sent to the base station with the same period T1. Assuming that the number of UEs requesting/subscribed for the TSN clock information from TSN domain 2 is low, the base station may skip one of every two TSN clock information deliveries, by extending the period from T1 to T2, wherein each un-skipped delivery is aggregated with the TSN clock information from TSN domain 1. Meanwhile, assuming that the number of UEs requesting/subscribed for the TSN clock information from TSN domain 1 is high, the base station may retain the period T1 for delivering the TSN clock information from TSN domain 1.

Figure 15:
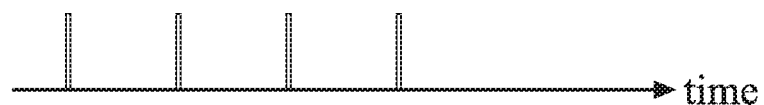
FIG. 15 is a schematic diagram illustrating aggregated delivery of TSN clock information from multiple TSN domains according to another embodiment of the application.
Figure 15:
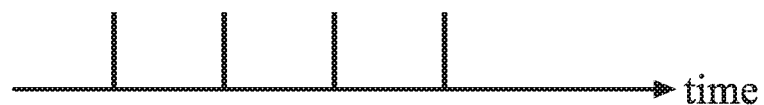
Figure 15:
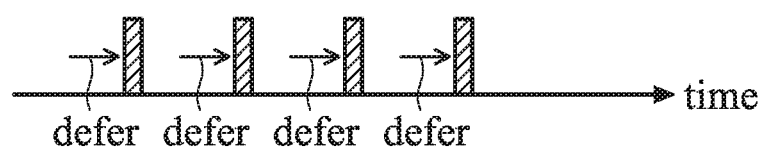

FIG. 15 is a schematic diagram illustrating aggregated delivery of TSN clock information from multiple TSN domains according to another embodiment of the application.

In this embodiment, the TSN clock information delivery is performed on a periodic basis by the base station, and the TSN clock information from different TSN domains is aggregated before being delivered to the UE(s).

As shown in FIG. 15, the base station receives the TSN clock information from TSN domain 1 and TSN domain 2 at different times but with the same periodicity. Specifically, the TSN clock information from TSN domain 1 arrives at the base station earlier than the TSN clock information from TSN domain 2.

For each delivery of the TSN clock information from TSN domain 1, the base station waits until the TSN clock information from TSN domain 2 is received, and then aggregates the TSN clock information from both TSN domains. After that, the base station sends the aggregated information to the UE(s) right after the TSN clock information from TSN domain 2 is received.

Figure 16:
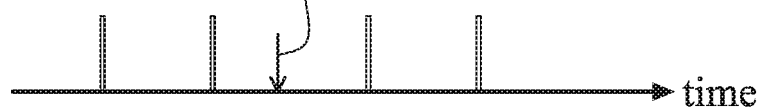
FIG. 16 is a schematic diagram illustrating aggregated delivery of TSN clock information from multiple TSN domains according to another embodiment of the application.
Figure 16:
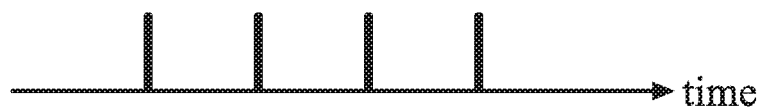
Figure 16:
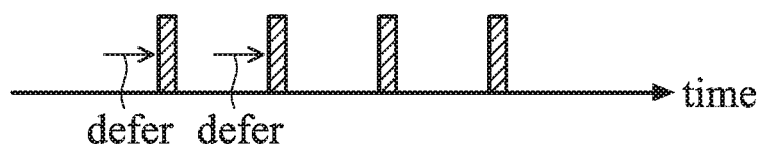

FIG. 16 is a schematic diagram illustrating aggregated delivery of TSN clock information from multiple TSN domains according to another embodiment of the application.

Similar to the embodiment of FIG. 15, for each delivery, the base station waits until the TSN clock information from TSN domain 1 and the TSN clock information from TSN domain 2 are both received, and then aggregates the TSN clock information from both TSN domains.

However, deferring the deliveries of the TSN clock information from TSN domain 1 may require extra storage space for buffering the TSN clock information from TSN domain 1. In order to eliminate the burden of buffering the TSN clock information, the base station may send a signaling message to TSN domain 1 to adjust the configuration of TSN clock information delivery.

Specifically, the signaling message may indicate a timing offset for TSN domain 1 to shift the next delivery to align with the delivery from TSN domain 2. After that, the base station may receive the TSN clock information from TSN domain 1 and TSN domain 2 at approximately the same time with the same periodicity, and send the aggregated information to the UE(s) right after the TSN clock information is received.

In view of the forgoing embodiments, it should be appreciated that the present application realizes accurate reference timing delivery between the Ethernet-based TSN domain and the cellular-based (e.g., 5G and/or 6G) TSC domain, by allowing the base station to schedule early transmission or deferred transmission of the TSN clock information to the UE(s) in a way that timing synchronization for TSN may be guaranteed and the efficiency of TSN clock information delivery may be improved.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A base station of a telecommunication network, comprising:
   a wired transceiver, configured to provide wired communication with a first Time-Sensitive Networking (TSN) domain outside the telecommunication network;
   a wireless transceiver, configured to provide wireless Time-Sensitive Communication (TSC) with User Equipment (UE); and
   a controller, configured to receive first TSN clock information from the first TSN domain via the wired transceiver, and schedule a transmission of the first TSN clock information to the UE via the wireless transceiver;
   wherein the transmission of the first TSN clock information is scheduled according to at least one of the following:
      a number of UEs requesting the first TSN clock information;
      an accuracy or age requirement of the first TSN clock information, which is indicated by a TSN clock request received from the UE; and
   wherein the transmission of the first TSN clock information is skipped when the number of UEs requesting the first TSN clock information is not higher than a fifth threshold, or when the accuracy or age requirement of the first TSN clock information is low enough to endure a period of the transmission of the first TSN clock information being extended.

2. The base station of claim 1, wherein the transmission of the first TSN clock information is scheduled according to at least one of the following:
- a determination of whether the UE is new to the base station;
- a determination of whether the UE requests updating TSN clock information;
- a first age of the first TSN clock information from the time the first TSN clock information was sent from the first TSN domain to the time of the scheduling of the transmission of the first TSN clock information;
- a second age of the first TSN clock information from the time the first TSN clock information was received at the base station to the time of the scheduling of the transmission of the first TSN clock information;
- a first time duration from the time of the scheduling of the transmission of the first TSN clock information to the time of the next arrival of the first TSN clock information at the base station;
- a second time duration from the time of the scheduling of the transmission of the first TSN clock information to the time of the next expected transmission of the first TSN clock information at the base station.

3. The base station of claim 2, wherein the transmission of the first TSN clock information is scheduled in the earliest available TSC communication resource when at least one of the following conditions is satisfied:
- when the UE is new to the base station;
- when the UE requests a TSN clock information update;
- when the first age is lower than a first threshold;
- when the second age is lower than a second threshold;
- when the first time duration is longer than a third threshold;
- when the second time duration is longer than a fourth threshold;
- when the number of UEs requesting the first TSN clock information is higher than a fifth threshold.

4. The base station of claim 2, wherein the transmission of the first TSN clock information is deferred when at least one of the following conditions is satisfied:
- when the UE is not new to the base station;
- when the UE does not request updating TSN clock information;
- when the first age is not lower than a first threshold;
- when the second age is not lower than a second threshold;
- when the first time duration is not longer than a third threshold;
- when the second time duration is not longer than a fourth threshold;
- when the number of UEs requesting the first TSN clock information is not higher than a fifth threshold.

5. The base station of claim 1, wherein, prior to receiving the first TSN clock information, the controller is further configured to send a signaling message to the first TSN domain via the wired transceiver to request the first TSN clock information.

6. The base station of claim 1, wherein the controller is further configured to send a signaling message to the first TSN domain via the wired transceiver to request desirable configuration of TSN clock information delivery.

7. The base station of claim 6, wherein the desirable configuration of TSN clock information delivery comprises at least one of the following parameters:
- a period after which the delivery of the first TSN clock information repeats;
- a starting time of the delivery of the first TSN clock information;
- an ending time of the delivery of the first TSN clock information; and
- a timing offset for the next delivery of the first TSN clock information.

8. The base station of claim 1, wherein the controller is further configured to send a signaling message to the UE via the wireless transceiver to announce the availability of the first TSN clock information.

9. The base station of claim 1, wherein, prior to scheduling the transmission of the first TSN clock information, the controller is further configured to receive a TSN clock request for the first TSN clock information from the UE via the wireless transceiver.

10. The base station of claim 9, wherein, prior to receiving the TSN clock request from the UE, the controller is further configured to send a signaling message to the UE via the wireless transceiver to indicate a Physical Random Access Channel (PRACH) resource for the UE to send the TSN clock request, and a mapping between a RACH preamble and the first TSN domain.

11. The base station of claim 10, wherein the TSN clock request is the RACH preamble or a message-3 of a RACH procedure.

12. The base station of claim 1, wherein the wired transceiver is further configured to provide wired communication with a second TSN domain outside the telecommunication network, and the controller is further configured to receive second TSN clock information from the second TSN domain via the wired transceiver, and aggregate transmission of the second TSN clock information with the transmission of the first TSN clock information.

13. The base station of claim 1, wherein the first TSN clock information is transmitted through a broadcast channel, or is transmitted in a System Information Broadcast (SIB) message, a unicast packet, or a group-cast packet.

14. A method for Time-Sensitive Networking (TSN) clock information delivery, executed by a base station of a telecommunication network, which is connected to a first TSN domain outside the telecommunication network and in Time-Sensitive Communication (TSC) with a User Equipment (UE), the method comprising:
- receiving first TSN clock information from the first TSN domain; and
- scheduling a transmission of the first TSN clock information to the UE;
- wherein the transmission of the first TSN clock information is scheduled according to at least one of the following:
  - a number of UEs requesting the first TSN clock information; and
  - an accuracy or age requirement of the first TSN clock information, which is indicated by a TSN clock request received from the UE; and
- wherein the transmission of the first TSN clock information is skipped when the number of UEs requesting the first TSN clock information is not higher than a fifth threshold, or when the accuracy or age requirement of the first TSN clock information is low enough to endure the period of the transmission of the first TSN clock information being extended.

15. The method of claim 14, wherein the transmission of the first TSN clock information is scheduled according to at least one of the following:
- a determination of whether the UE is new to the base station;
- a determination of whether the UE requests updating TSN clock information;

a first age of the first TSN clock information from the time the first TSN clock information was sent from the first TSN domain to the time of the scheduling of the transmission of the first TSN clock information;

a second age of the first TSN clock information from the time the first TSN clock information was received at the base station to the time of the scheduling of the transmission of the first TSN clock information;

a first time duration from the time of the scheduling of the transmission of the first TSN clock information to the time of the next arrival of the first TSN clock information at the base station;

a second time duration from the time of the scheduling of the transmission of the first TSN clock information to the time of the next expected transmission of the first TSN clock information at the base station.

16. The method of claim 15, wherein the transmission of the first TSN clock information is scheduled in the earliest available TSC communication resource when at least one of the following conditions is satisfied:

when the UE is new to the base station;
when the UE requests a TSN clock information update;
when the first age is lower than a first threshold;
when the second age is lower than a second threshold;
when the first time duration is longer than a third threshold;
when the second time duration is longer than a fourth threshold;
when the number of UEs requesting the first TSN clock information is higher than a fifth threshold.

17. The method of claim 15, wherein the transmission of the first TSN clock information is deferred when at least one of the following conditions is satisfied:

when the UE is not new to the base station;
when the UE does not request updating TSN clock information;
when the first age is not lower than a first threshold;
when the second age is not lower than a second threshold;
when the first time duration is not longer than a third threshold;
when the second time duration is not longer than a fourth threshold;
when the number of UEs requesting the first TSN clock information is not higher than a fifth threshold.

18. The method of claim 14, further comprising:
prior to receiving the first TSN clock information, sending a signaling message to the first TSN domain to request the first TSN clock information.

19. The method of claim 14, further comprising:
sending a signaling message to the first TSN domain to request desirable configuration of TSN clock information delivery.

20. The method of claim 19, wherein the desirable configuration of TSN clock information delivery comprises at least one of the following parameters:

a period after which the delivery of the first TSN clock information repeats;
a starting time of the delivery of the first TSN clock information;
an ending time of the delivery of the first TSN clock information; and
a timing offset for the next delivery of the first TSN clock information.

21. The method of claim 14, further comprising:
sending a signaling message to the UE to announce the availability of the first TSN clock information.

22. The method of claim 14, further comprising:
prior to scheduling the transmission of the first TSN clock information, receiving a TSN clock request for the first TSN clock information from the UE.

23. The method of claim 22, further comprising:
prior to receiving the TSN clock request from the UE, sending a signaling message to the UE to indicate a Physical Random Access Channel (PRACH) resource for the UE to send the TSN clock request, and a mapping between a RACH preamble and the first TSN domain.

24. The method of claim 23, wherein the TSN clock request is the RACH preamble or a message-3 of a RACH procedure.

25. The method of claim 14, wherein the base station is further connected to a second TSN domain outside the telecommunication network, and the method further comprises:

receiving second TSN clock information from the second TSN domain; and
aggregating transmission of the second TSN clock information with the transmission of the first TSN clock information.

26. The method of claim 14, wherein the first TSN clock information is transmitted through a broadcast channel, or is transmitted in a System Information Broadcast (SIB) message, a unicast packet, or a group-cast packet.

* * * * *